(12) United States Patent
George et al.

(10) Patent No.: US 10,671,580 B2
(45) Date of Patent: *Jun. 2, 2020

(54) DATA STREAM QUALITY MANAGEMENT FOR ANALYTIC ENVIRONMENTS

(71) Applicant: International Business Machines Corporation, Armonk, NY (US)

(72) Inventors: Randy George, Austin, TX (US); Robert J. McKeown, Newburyport, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 613 days.

This patent is subject to a terminal disclaimer.

(21) Appl. No.: 15/142,505

(22) Filed: Apr. 29, 2016

(65) Prior Publication Data

US 2016/0246822 A1 Aug. 25, 2016

Related U.S. Application Data

(63) Continuation of application No. 13/764,696, filed on Feb. 11, 2013, now Pat. No. 9,690,812, which is a (Continued)

(51) Int. Cl.
*G06F 16/00* (2019.01)
*G06F 16/22* (2019.01)
(Continued)

(52) U.S. Cl.
CPC .......... *G06F 16/22* (2019.01); *G06F 16/215* (2019.01); *G06F 16/2365* (2019.01); *G06F 16/24568* (2019.01); *G06F 40/169* (2020.01)

(58) Field of Classification Search
CPC ......... G06F 17/30303; G06F 17/30312; G06F 17/30516; G06F 16/2365; G06F 16/24568; G06F 16/00; G06F 16/215
See application file for complete search history.

(56) References Cited

U.S. PATENT DOCUMENTS 7,519,991 B2 *  4/2009  Brustoloni .............. H04L 47/10
                                                        709/223
7,676,522 B2    3/2010  Klein et al.
(Continued)

OTHER PUBLICATIONS

Brewer, Orlie T., and Arun Ayyagari. "Comparison and analysis of measurement and parameter based admission control methods for Quality of Service (QoS) provisioning." 2010—MILCOM 2010 Military Communications Conference. IEEE, 2010.*
(Continued)

*Primary Examiner* — Nan Hutton
(74) *Attorney, Agent, or Firm* — James L. Baudino (57) ABSTRACT

Data stream quality management for analytic environments includes an ingress quality specification (IQS) module with a data stream analytic module. The analytic module has a data quality expectation for data of the data stream and receives the data stream from the IQS module. A selector module receives the data stream from an object and selects a subset of the received data stream. A predicate module applies a predicate to the subset to determine if the subset meets the quality expectation of the analytic module. The predicate module modifies the subset of data by annotating the subset to indicate a quality status based on whether the subset meets the quality expectation. The IQS module outputs the data stream with the annotated subset of data to the analytic module. The analytic module outputs an analysis of the object based on whether the annotated subset of data met the quality expectation.

17 Claims, 4 Drawing Sheets

Related U.S. Application Data continuation of application No. 13/463,850, filed on May 4, 2012, now Pat. No. 9,460,131.

(51) Int. Cl.
*G06F 16/215* (2019.01)
*G06F 16/2455* (2019.01)
*G06F 40/169* (2020.01)
*G06F 16/23* (2019.01)

(56) References Cited

U.S. PATENT DOCUMENTS

| | | | | |
|---|---|---|---|---|
| 7,843,967 B2* | 11/2010 | Baruah | | H04L 47/10 |
| | | | | 370/466 |
| 9,270,544 B2 | 2/2016 | Goyal et al. | | |
| 2009/0086024 A1* | 4/2009 | Brookins | | H04N 5/23229 |
| | | | | 348/143 |
| 2009/0100014 A1* | 4/2009 | Gedik | | G06F 17/30657 |
| 2009/0109046 A1* | 4/2009 | Gielniak | | G01R 31/3679 |
| | | | | 340/636.12 |
| 2011/0016469 A1* | 1/2011 | Klein | | G06F 17/30516 |
| | | | | 718/100 |
| 2012/0082048 A1* | 4/2012 | Taft | | H04L 12/1836 |
| | | | | 370/252 |

OTHER PUBLICATIONS

Dinakaran, M., and P. Balasubramanie. "An Analysis on QoS of Network Mobility." International Journal of Advanced Research in Computer Science 1.3 (2010).*

Simmhan, Yogesh L., et al.; Towards a Quality Model for Effective Data Selection in Collaboratories; IEEE Workshop on Scientific Workflows and Dataflows; 2006; pp. 1-4.

Diao, Yanlei, et al.; Capturing Data Uncertainty in High-Volume Stream Processing; 4th Biennial Conference on Innovative Data Systems Research (CIDR); Jan. 4-7, 2009.

Kaheel, Ayman, et al.; Quality-of-Service Mechanisms in IP-over-WDM Networks; IEEE Communications Magazine; vol. 40; Issue: 12; 2002.

* cited by examiner

DATA STREAM QUALITY MANAGEMENT FOR ANALYTIC ENVIRONMENTS

BACKGROUND

In various types of runtime environments, various types of data associated with usage (e.g., data traffic), environmental conditions (e.g., temperature), or other types of data may be collected via sensors or other types of devices and analyzed. This data is oftentimes analyzed in real time or as the data stream is being generated/communicated.

BRIEF SUMMARY

Embodiments of the present invention disclose a method, computer program product, and system for data stream quality management for analytic environments. An ingress quality specification (IQS) module is executable by a processor in a runtime environment with a data stream analytic module. The data stream analytic module has a data quality expectation for data of the data stream and receives the data stream from the IQS module. The IQS module includes a selector module that receives the data stream from an object and selects a subset of the received data stream. The IQS module also includes a predicate module that applies a predicate to the subset of data to determine if the subset of data meets the quality expectation of the analytic module. The predicate module also modifies the subset of data by annotating the subset of data to indicate a quality status based on whether the subset of data meets the quality expectation of the analytic module. The IQS module outputs the data stream with the annotated subset of data to the analytic module. The analytic module outputs an analysis of the object based on whether the annotated subset of data met the quality expectation.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide a method, system and computer program product for data stream quality management in an analytic environment. For example, in some embodiments, the method and technique includes: deploying, into a runtime environment with a data stream analytic module, an ingress quality specification (IQS) module associated with the analytic module; receiving, by the IQS module, the data stream; analyzing, by the IQS module, a subset of data of the data stream to determine if the subset of data meets a quality expectation of the analytic module; annotating the subset of data to indicate a quality status based on whether the subset of data meets the quality expectation of the analytic module; and outputting the data stream to the analytic module. Thus, in some embodiments of the present disclosure, analytic modules and IQS modules may be developed and deployed independently of a runtime infrastructure in a plug-and-play manner. Embodiments of the present disclosure utilize the IQS module to pre-screen the ingress data to assess its quality level/characteristics based on a level of quality expected by the associated analytic module. Thus, embodiments of the present disclosure enable different IQS modules to be selected and deployed with one or more different analytic modules based on different quality and/or analysis contexts.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
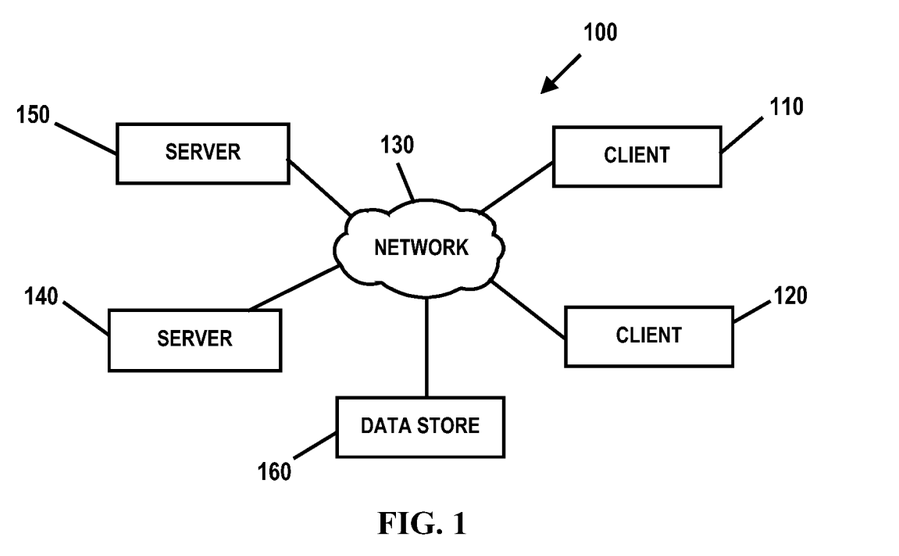
FIG. 1 is an embodiment of a network of data processing systems in which the illustrative embodiments of the present disclosure may be implemented.
Figure 2:
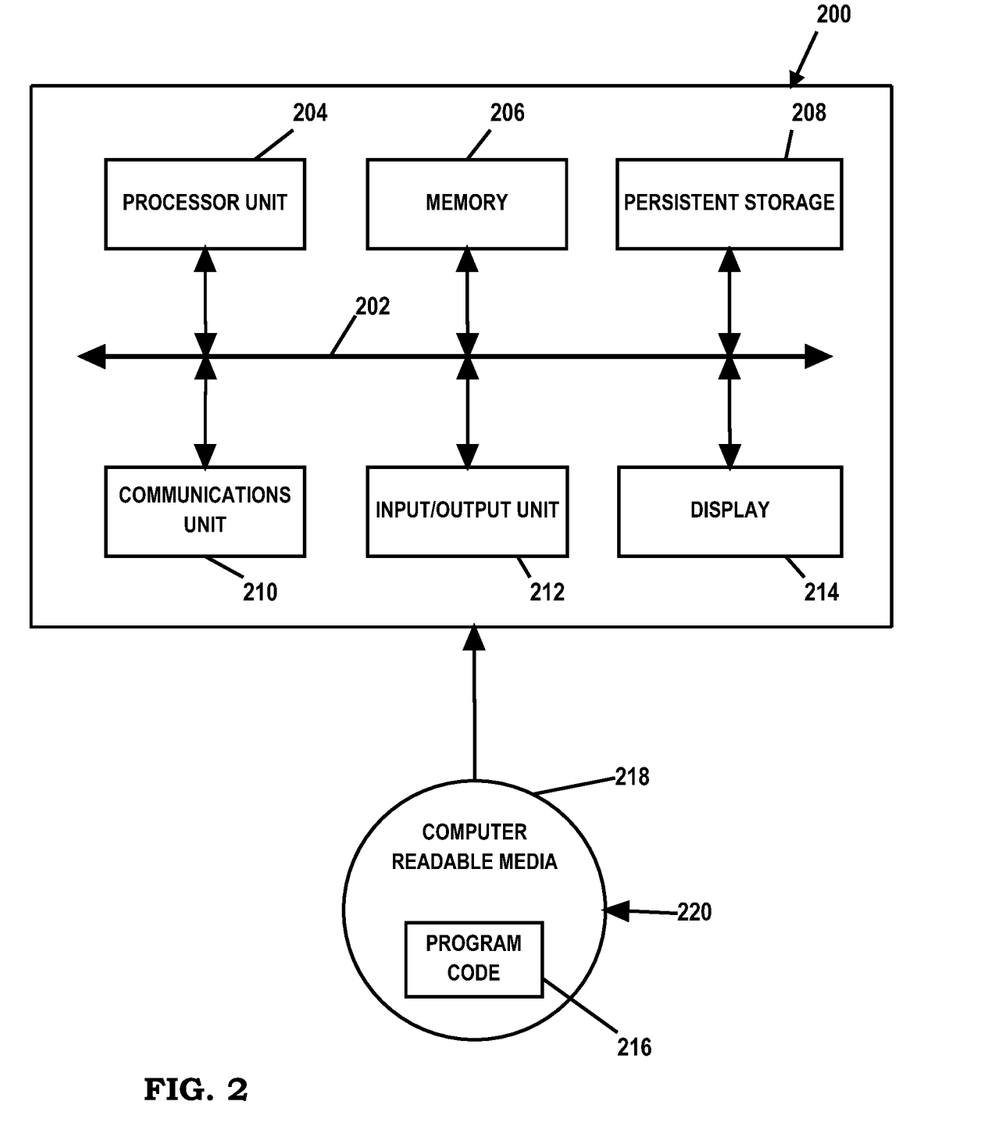
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a data quality management system according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
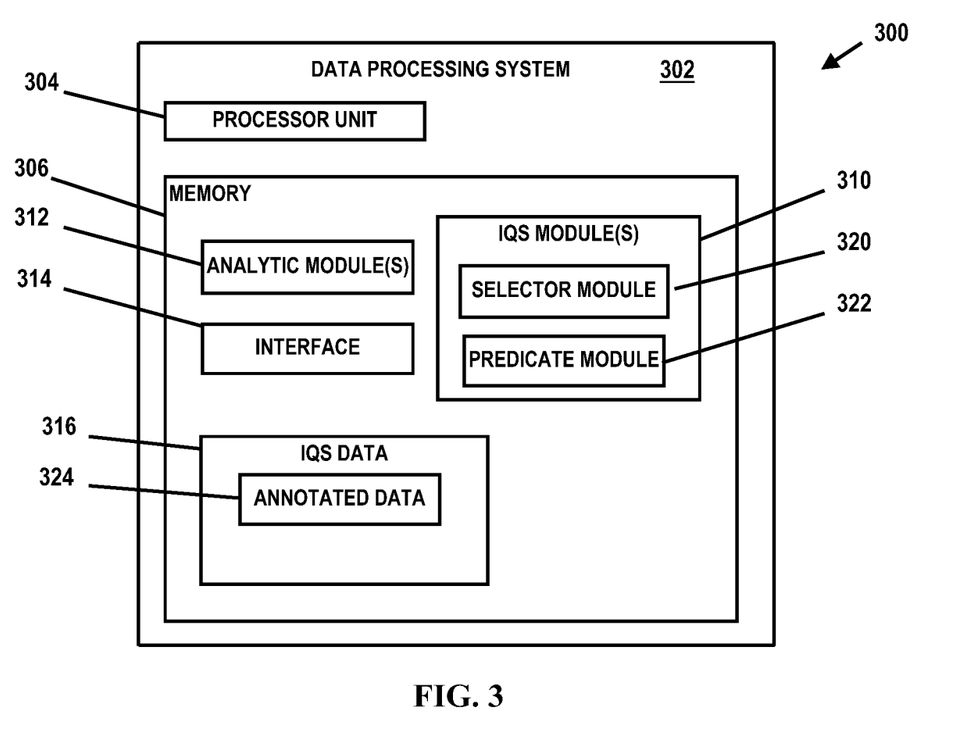
FIG. 3 is a diagram illustrating an embodiment of a data quality management system for an analytic environment in which illustrative embodiments of the present disclosure may be implemented.

FIG. 3 is an illustrative embodiment of a system 300 for data quality management. System 300 may be implemented on data processing systems or platforms such as, but not limited to, servers 140 and/or 150, clients 110 and/or 120, or at other data processing system and/or node locations. For example, in the embodiment illustrated in FIG. 3, system 300 comprises a data processing system 302 having a processor unit 304 and a memory 306. In the embodiment illustrated in FIG. 3, memory 306 includes one or more ingress quality specification (IQS) modules 310, one or more analytic modules 312 an interface 314, and IQS data 316. IQS module(s) 310, analytic modules(s) 312 and interface 314 may be implemented in any suitable manner using known techniques that may be hardware-based, software-based, or some combination of both. For example, IQS module(s) 310, analytic modules(s) 312 and interface 314 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Analytic module(s) 312 is configured to analyze incoming data, such as an incoming data stream received from some type of object/data emitter (e.g., a sensor, gateway, router, etc.) to evaluate and/or otherwise provide an output of such analysis to enable various characteristics of the data stream, and thus the corresponding monitored object or data emitter, to be evaluated, monitored and/or analyzed. For example, analytic module 312 may be used to evaluate and/or analyze a data stream to determine whether the monitored object is performing as expected. Thus, in operation, the quality and reliability of the results produced by analytic module 312 is generally highly dependent on the quality of the incoming (ingress) data. Further, over time, various environmental effects (e.g., temporary lost connectivity to sensors, poor operational process, etc.) may cause the quality of ingress data to be compromised. The characteristics and use of particular analytic modules 312 may also be context-specific. For example, while one deployment of an instance of an analytic module 312 may have lower quality ingress data (e.g., a test facility having a relaxed expectation on the accuracy of the output of analytic module 312), another environment (e.g., data used for service level agreement (SLA) enforcement) could have both expectations of high-quality ingress data as well as commensurate expectations on the results produced by that analytic module 312.

IQS module(s) 310 is configured as a separate artifact from analytic module(s) 312 but is configured to take into consideration a quality characteristic of ingress data expected by a corresponding analytic module(s) 312. For example, in some embodiments, IQS module(s) 310 is configured to pre-evaluate data that is targeted to a respective instance of an analytic module 312 to assess the quality of that data based on the quality of data expected by the respective instance of the analytic module 312 ordinarily needed to output useful and/or accurate results. In some embodiments, IQS module 310 includes a selector module 320 and a predicate module 322. Selector module 320 is configured to select a subset of ingress data, and predicate module 322 is configured to apply a test or predicate to such data subset to determine whether such data subset meets a level of data quality expected by such analytic module 312. The subset of ingress data selected by selector module 320 and the predicate applied by predicate module 322 corresponds to and/or is otherwise based on a data quality expectation of the associated analytic module 312. For example, selector module 320 may be configured to select a particular subset of data targeted for the analytic module 312 against which a predicate is applied based on a rule applied to some set of the ingress data (e.g., a time period of collected data, a quantity of data points or count records, or other measure against which a predicate for data quality may be applied). Predicate module 322 applies a predicate against the selected data subset. The predicate applied by predicate module 322 may be used to determine whether the data subset contains spikes, gaps, missing data records, etc.

Interface 314 may comprise a graphical user interface (GUI) or other type of interface enabling a user and/or administrator to identify IQS modules 310 associated with particular analytic modules 312 and/or select particular IQS modules 310 for deployment with particular analytic modules 312. For example, in some embodiments, IQS modules 310 and analytic modules 312 may be identified and/or otherwise associated with each other via a relational database, lookup table or otherwise. For example, a particular IQS module 310 may be configured to be deployed with one or more different analytic modules 312. In this example, different IQS modules 310 may be configured to assess different data quality characteristics even though a data output from the different IQS modules 310 may be directed toward different instances of the same analytic module 312. In some embodiments, interface 314 may be configured to enable the quality parameters of each IQS module 310 to be identified/determined by a user/administrator to enable the user/administrator to select and deploy particular IQS modules 310 based on the quality context sought for the associated analytic module 312. Further, different IQS modules 310 (e.g., each configured to assess and/or determine a different quality characteristic for a corresponding data input) may be deployable with a particular analytic module 312, thereby enabling different IQS modules 310 to be deployed for one particular analytic module 312.

In operation, IQS module(s) 310 may be specified independently of, but with consideration of, the particular analytic module 312 the IQS module(s) 310 will be used with. In some embodiments, both the IQS modules(s) 310 and the target analytic module(s) 312 are configured as plug-and-play into a core infrastructure. For example, IQS module(s) 310 may be compiled into a form suitable for the target runtime environment or can be left in raw (text) form and have the compilation/binding occur at runtime (e.g., as is typical for dynamic language systems). The IQS module(s) 310 (or its derived form) is deployed and bound into the runtime infrastructure with the respective analytic module 312. At runtime, data typically intended for or typically directly presented to a particular analytic module 312 is first routed to runtime artifacts created based upon processing of the IQS module(s) 310. Subsets of that data, based upon the selector criteria applied by selector module 320, are tested against a predicate by predicate module 322. In some embodiments, the data analyzed by IQS module 310 is annotated with a result of the selection/predicate test. For example, in some embodiments, data which satisfies the applied predicate are flagged as having 'passed' the IQS predicate test, and data which does not satisfy the predicate are flagged as having 'failed' the IQS predicate test. The flagged and/or annotated data is output by IQS module 310 to the target analytic module 312 where analytic algorithm-specific behavior based on this pass/fail consideration can be made by analytic module 312. In FIG. 3, the annotated data is illustrated as annotated data 324. Thus, for example, in some embodiments, analytic module 312 may be deployed independently of any IQS module 310. A user/administrator can thereafter install and/or otherwise deploy an instance of an IQS module 310 and associate/link the particular IQS module 310 with the particular deployed analytic module 312. Similarly, embodiments of the present invention may provide an IQS module 310 template from which various instances of the particular IQS modules 310 may be created and then be associated with particular instances of a corresponding analytic module 312. The user/administrator may also set appropriate configurations on the IQS module 310 instances.

It should be understood that the annotation of data resulting from the application of the predicate test by IQS module 310 may vary. For example, as described above, both data passing and failing the predicate test may be annotated. However, in some embodiments, either only the data passing the IQS predicate test or only the data failing the predicate test may be correspondingly annotated. Annotations of the data output by IQS module 310 enables the analytic module 312 to discern between data passing or failing the predicate test applied by IQS module 310. The annotating and/or flagging of the data based on a result of the IQS predicate application may vary. For example, in some embodiments, an additional field on a tuple may be used to indicate the quality status resulting from the IQS predicate test. However, it should be understood that other methods may be used to flag or annotate the quality status of the analyzed data.

In some embodiments, multiple IQS modules 310 may be deployed with a particular instance of an analytic module 312. For example, in some embodiments, each different IQS module 310 may receive and process a data stream destined for the analytic module 312 and apply its respective IQS selector/predicate test to the data stream. Each IQS module 310 may annotate the output data correspondingly. For example, in some embodiments, a data stream may first be input to one IQS module 310, annotated based on its IQS predicate test, the resulting annotated data output to another IQS module 310, annotated based on its IQS predicate test, and the resulting annotated data input to analytic module 312. The analytic module 312 may be configured to discern between different annotations in the data (e.g., based on particular field values or other flag information).

Figure 4:
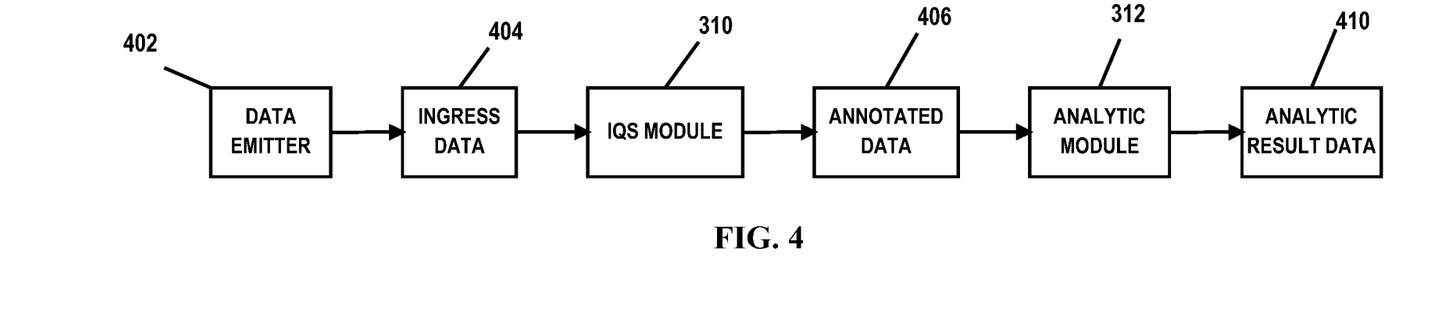
FIG. 4 is a diagram illustrating an embodiment of data flow processing according to the present disclosure.

FIG. 4 is a diagram illustrating data processing according to the present disclosure. In the embodiment illustrated in FIG. 4, a data emitter 402 (e.g., a sensor, router, or other type of device outputting data based on a monitored object or other type of data acquisition device) outputs data 404. The data 404 may comprise a series of data points or records, a continuous (or substantially continuous) flow of data (e.g., a music signal, voltage level signal, etc.) or other type or form of output data (referred to herein as a data stream). The data 404 is input to IQS module 310. Selector module 320 analyzes the input data 404 and selects a subset of the data against which to apply a predicate. Predicate module 322 applies the predicate to the selected subset of data and determines whether the subset of data meets the predicate (passes) or not (fails). IQS module 310 annotates the subset of data based on the result of the predicate application to indicate a quality status corresponding to the selected subset and thereafter outputs the annotated data 406 to analytic module 312.

Analytic module 312 receives the annotated data 406 and analyzes the annotated data 406 based in its defined analysis algorithm. In some embodiments, analytic algorithm 312 analyzes the annotated data 406 to determine a quality status of the data. For example, in some embodiments, analytic module 312 identifies flags, field values, or other codes representing a quality status to determine which data met or passed the predicate applied by IQS module 310 and which data did not meet the applied IQS predicate. In some embodiments, analytic module 312 may omit data from analysis/output that did not meet the IQS predicate or was not indicated/flagged as having the requisite quality level/status. As an example, consider that data emitter 402 is configured to poll and/or output a data record every ten minutes. In this example, selector module 320 may select a window of received data corresponding to 3600 seconds (one hour). The IQS predicate for a selected window or subset of the received data may be that all six values for a corresponding period (3600 seconds) are needed by a corresponding analytic module 312 (e.g., to compute/output an hourly average). Thus, if a data record count is less than six for the selected window/subset of data, IQS module 310 may flag the data subset with a quality status identifier indicating that the data subset did not meet the quality predicate. The annotated/flagged data is then output by IQS module 310 to analytic module 312. Analytic module 312 processes the received data and generates an output or analytic result data 410. Analytic module 312 identifies the quality status indication and, in some embodiments, does not output a result for the corresponding time period in result data 410. Thus, if the data received by analytic module 312 for a particular time period (or a particular subset of data) does not meet a quality level as defined by IQS module 310, analytic module 312 may omit such data or omit an output of an analysis of such data. If a user/administrator desires to change a measurement and/or quality context (e.g., instead of one data record every ten minutes, a data record is output/received every one minute, and a minimum of forty-five data records for a 3600 second time period are needed to compute a reasonable average for such time period), a different IQS module 310 may be selected/deployed with the same analytic module 312 (e.g., replacing one IQS module 310 with a different IQS module 310). The new IQS module 310 would include a corresponding predicate for analyzing and annotating a subset of data that includes at least forty-five data records for such 3600 second time period.

Figure 5:
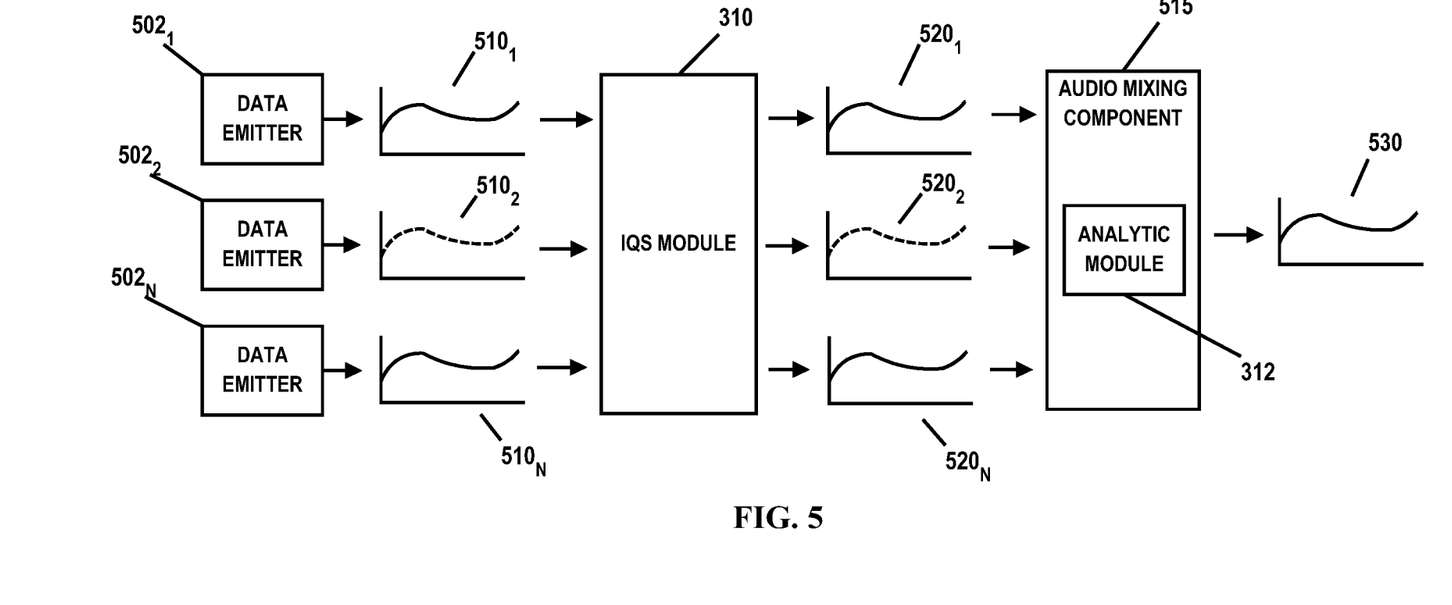
FIG. 5 is a diagram illustrating another embodiment of data flow processing according to the present disclosure.

FIG. 5 is a diagram illustrating another embodiment of data processing according to the present disclosure. In this embodiment, IQS module 310 receives digital audio data from a plurality of different sources or data emitters $502_1$-$502_n$. In this example, each data emitter $502_1$-$502_n$ outputs or provides a respective digital audio signal $510_1$-$510_n$. In the embodiment illustrated in FIG. 5, an audio mixing component 515 may be used to provide audio mixing of received digital audio data. Thus, in the illustrated embodiment, audio mixing component 515 may include analytic module 312 for identifying a data quality status indicator for received audio signals. Selector module 320 may select a subset of received digital audio data for each digital audio data stream corresponding to some defined window or time period. Predicate module 322 applies the quality predicate (e.g., some minimum quantity of data samples). In this example, IQS module 310 may identify signal $510_2$ from emitter $502_2$ as having low data quality or a level of data quality falling below the applied predicate. IQS module 310 annotates the audio signals output to analytic module 312 with a corresponding quality status indicator (output as annotated digital audio signals $520_1$-$520_n$). As described above, IQS module 310 may annotate each digital audio signal stream with a status indicator identifying such data as either having passed or failed the quality predicate applied by IQS module 310 (or IQS module 310 may only annotate the digital audio data streams that passed the predicate, or vice versa). In this example, analytic module 312 may be configured to omit a particular audio signal from such audio mixing if such signal is of low data quality. This, in this example, analytic module 312 identifies the quality status indicators in signals $520_1$-$520_n$ and, responsive to determining that signal $520_2$ contained a low data quality status indication, omit signal $510_2$/$520_2$ from an audio signal mix 530 output by mixing component 515.

Figure 6:
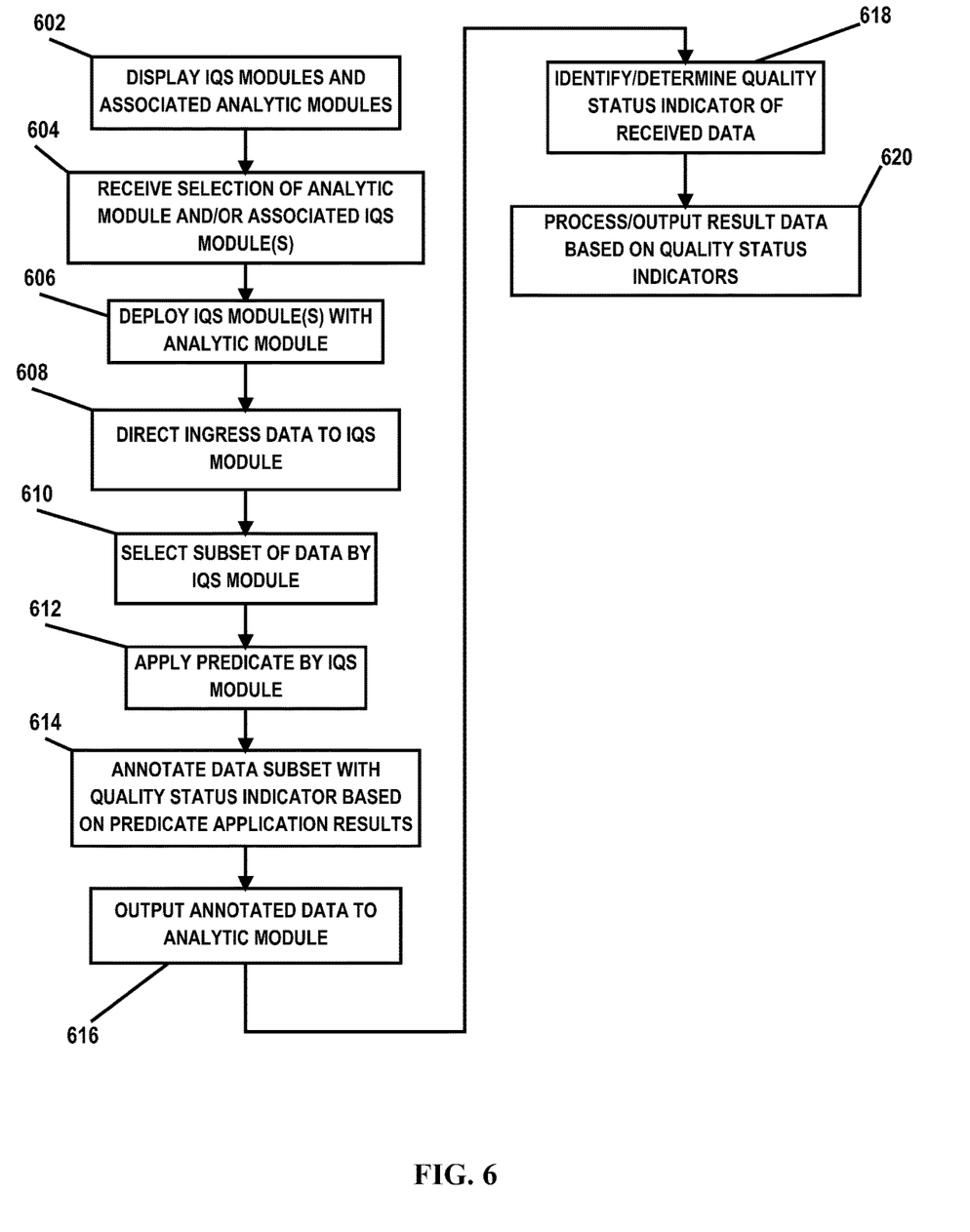
FIG. 6 is a flow diagram illustrating an embodiment of a method for data quality management in an analytic environment according to the present disclosure.

FIG. 6 is a flow diagram illustrating an embodiment of a method for data quality management. The method begins at block 602, where interface 314 displays and/or otherwise presents information corresponding to analytic modules 312 and/or IQS modules 310. For example, a user or administrator may view and/or otherwise identify particular analytic modules 312 to deploy or, if already deployed, identify particular IQS modules (including their associated quality predicate parameters). At block 604, system 302 receives a selection of an analytic module 312 or, if already deployed, a selection of one or more IQS modules 310 that are associated with a designated analytic module 312. For example, a user/administrator may use interface 314 to identify and/or otherwise select particular IQS modules 310 to deploy with a particular analytic module in a runtime environment (or to replace an already deployed IQS module 310). At block 606, the selected IQS module(s) 310 are deployed into the runtime environment and bound to a respective analytic module 312. For example, binding the selected IQS module 310 to the analytic module 312 may be performed to configure system 302 to route ingress data typically destined to analytic module 312 to IQS module 310 instead. The IQS module 310 may also be configured to output its data to the respective analytic module 312.

At block 608, ingress data (e.g., from a data emitter, such as emitter 402 or 502) is directed to IQS module 310. At block 610, selector module 320 selects and/or otherwise identifies a subset of the received data against which to apply an IQS predicate. At block 612, predicate module 322 applies the IQS predicate and/or otherwise tests the subset of data against the IQS predicate. At block 614, IQS module 310 annotates the subset of data with quality status indicators to indicate whether the subset of data met the applied IQS predicate. At block 618, IQS module 310 outputs the annotated data to analytic module 312. At block 618, analytic module 312 identifies and/or otherwise determines the quality status corresponding to the received data (e.g., identifying flags, reading field values, and/or otherwise determining whether the received data is of a quality expected by analytic module as defined by the predicate applied by IQS module 310). At block 62, analytic module 312 processes and/or otherwise outputs a result based on the quality status indicators (e.g., omitting a result for a particular subset of data, omitting low quality data from an output result, etc.).

Thus, embodiments of the present disclosure enable analytic modules and IQS modules to be developed and deployed independently of a target infrastructure in a plug-and-play manner. For example, embodiments of the present disclosure enable a variety of different quality/data analysis assemblies (i.e., combinations of analytic modules and IQS modules) of domain/technology specific contexts to be selected and deployed in a runtime environment. Thus, embodiments of the present disclosure enable a particular quality specification to be used in different contexts. For example, embodiments of the present disclosure enable a single analytic module to be associated with multiple IQS module instances, thereby enabling multiple quality requirements to be applied to a particular analytic module in a conjunctive manner. Embodiments of the present disclosure also provide potential computation savings (e.g., by avoiding expensive analytic module computation using low-quality data).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system, comprising:
    a processor;
    an ingress quality specification (IQS) module executable by the processor in a runtime environment with a data stream analytic module, the data stream analytic module having a data quality expectation for data of a data stream and configured to receive the data stream from the IQS module, the IQS module including:
        a selector module configured to receive the data stream from an object and select a subset of the received data stream; and
        a predicate module configured to:
            apply a predicate to the subset of data to analyze the subset of data to determine if the subset of data meets the quality expectation of the analytic module, the predicate determining whether the subset of data has missing data records; and
            modify the subset of data by annotating the subset of data to indicate a quality status based on whether the subset of data meets the quality expectation of the analytic module; and
    the IQS module operable to output the data stream with the annotated subset of data to the analytic module, the analytic module configured to assess an operating characteristic of the object based on whether the annotated subset of data met the quality expectation.

2. The system of claim 1, wherein the analytic module is executable by the processor to:
    receive the data stream from the IQS module;
    determine the quality status of the subset of data; and
    responsive to determining that the quality status indicates that the subset of data does not meet the quality expectation, omit the subset of data from an analysis of the data stream by the analytic module.

3. The system of claim 1, wherein the IQS module is executable by the processor to flag data of the subset passing the predicate.

4. The system of claim 3, wherein the IQS module is executable by the processor to flag data of the subset failing the predicate.

5. The system of claim 1, wherein the processor is configured to deploy the IQS module responsive to receiving a selection of the IQS module from a plurality of IQS modules associated with the analytic module.

6. A computer program product for data quality management, the computer program product comprising:
    a non-transitory computer readable medium having computer readable program code embodied therewith, the computer readable program code comprising computer readable program code configured to:
        receive a data stream from an object in a runtime environment;
        apply a predicate to a subset of data of the data stream to determine if the subset of data meets a quality expectation of a downstream analytic module, the predicate determining whether the subset of data has missing data records;
        analyze the subset of data based on the predicate;
        annotate the subset of data via an additional field of the data to indicate a quality status based on whether the subset of data meets the quality expectation of the analytic module; and
        output the data stream with the annotated subset of data to the analytic module, the analytic module operable to assess an operating characteristic of the object based on whether the annotated subset of data met the quality expectation.

7. The computer program product of claim 6, wherein the computer readable program code is configured to:
    select a portion of the data stream as the subset of data; and
    apply a predicate to the subset of data.

8. The computer program product of claim 7, wherein the computer readable program code is configured to flag data of the subset passing the predicate.

9. The computer program product of claim 8, wherein the computer readable program code is configured to flag data of the subset failing the predicate.

10. A system, comprising:
    an analytic module configured to analyze a data stream output by an object in a runtime environment and assess an operating characteristic of the object, the analytic module having a data quality expectation of data of the data stream;
    a memory storing a plurality of ingress quality specification (IQS) modules each corresponding to a different quality characteristic and each associated with the analytic module; and an interface configured to enable a selection of at least one IQS module from the plurality of IQS modules to deploy with the analytic module to:
receive the data stream from the object;
apply a predicate to a subset of data of the data stream to determine if the subset of data meets the quality expectation of the analytic module, the predicate determining whether the subset of data has missing data records;
analyze the subset of data based on the predicate;
modify the subset of data by annotating the subset of data to indicate a quality status based on whether the subset of data meets the quality expectation of the analytic module; and
output the data stream to the analytic module; and
wherein the analytic module is configured to receive the data stream from the IQS module, identify data not meeting the quality expectation based on the annotations, and omit from its assessment of the object the data not meeting the quality expectation.

11. The system of claim 10, wherein the selected IQS module is configured to:
select a portion of the data stream as the subset of data; and
apply a predicate to the subset of data.

12. The system of claim 11, wherein the selected IQS module is configured to flag data of the subset passing the predicate.

13. The system of claim 12, wherein the selected IQS module is configured to flag data of the subset failing the predicate.

14. The system of claim 10, wherein the selected IQS module is configured to annotate a field of the data indicating the quality status.

15. The system of claim 10, wherein the selected IQS module comprises:
a selector module configured to select a subset of the data stream; and
a predicate module configured to apply a predicate to the selected subset of data to determine whether the selected subset of data meets the quality expectation of the analytic module.

16. The system of claim 15, wherein the selector module is configured to select the subset of data based on a predetermined time period.

17. The system of claim 16, wherein the predicate module is configured to determine whether the selected subset of data includes a minimum quantity of data samples based on the quality expectation of the analytic module.

* * * * *